United States Patent
Azam et al.

(10) Patent No.: US 10,848,006 B2
(45) Date of Patent: Nov. 24, 2020

(54) CONFERENCING SYSTEM

(71) Applicant: HEWLETT-PACKARD DEVELOPMENT COMPANY, L.P., Houston, TX (US)

(72) Inventors: Syed S. Azam, Houston, TX (US); Alexander Wayne Clark, Houston, TX (US); Kent E. Biggs, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/093,527

(22) PCT Filed: Apr. 12, 2016

(86) PCT No.: PCT/US2016/027121
§ 371 (c)(1),
(2) Date: Oct. 12, 2018

(87) PCT Pub. No.: WO2017/180110
PCT Pub. Date: Oct. 19, 2017

(65) Prior Publication Data
US 2019/0123591 A1    Apr. 25, 2019

(51) Int. Cl.
| | | |
|---|---|---|
| H02J 7/00 | (2006.01) | |
| H02J 50/20 | (2016.01) | |
| H04L 12/18 | (2006.01) | |
| H02J 50/80 | (2016.01) | |
| H02J 50/40 | (2016.01) | |
| H02J 7/02 | (2016.01) | |

(52) U.S. Cl.
CPC .............. *H02J 50/20* (2016.02); *H02J 7/025* (2013.01); *H02J 50/40* (2016.02); *H02J 50/80* (2016.02); *H04L 12/1827* (2013.01); *H04L 12/1881* (2013.01)

(58) Field of Classification Search
CPC ............ H02J 50/20; H02J 50/80; H02J 50/40
USPC ........................................................ 320/108
See application file for complete search history.

(56) References Cited

U.S. PATENT DOCUMENTS

| | | |
|---|---|---|
| 8,270,894 B2 | 9/2012 | Earl |
| 9,252,628 B2 | 2/2016 | Leabman et al. |
| 2008/0315826 A1 | 12/2008 | Alberth, Jr. et al. |

(Continued)

FOREIGN PATENT DOCUMENTS

| | | |
|---|---|---|
| CN | 101042618 | 9/2007 |
| CN | 102760332 | 10/2012 |

(Continued)

OTHER PUBLICATIONS

Tso, Kam S., et al., "Multiuser Collaboration with Networked Mobile Devices", IEEE, 25th Digital Avionics Systems Conference, Oct. 15-19, 2006, http://ieeexplore.ieee.org/xpls/abs all.jps?arnumber=4106350, 2 pages.

*Primary Examiner* — Suchin Parihar
(74) *Attorney, Agent, or Firm* — Dierker & Kavanaugh PC

(57) ABSTRACT

A method of charging wireless peripheral devices within a conferencing system. The method includes, with a conference controller, identifying a plurality of sets of peripheral devices in communication with the conference controller, and wirelessly charging the sets of peripheral devices based on a number of policies that define prioritization of charging of the sets of peripheral devices.

17 Claims, 5 Drawing Sheets

(56) References Cited

U.S. PATENT DOCUMENTS

| | | |
|---|---|---|
| 2012/0268238 A1 | 10/2012 | Park et al. |
| 2012/0284647 A1 | 11/2012 | Fradkin et al. |
| 2013/0109371 A1* | 5/2013 | Brogan ................ G06F 1/1692 455/420 |
| 2013/0201209 A1 | 8/2013 | Findlay et al. |
| 2013/0297844 A1* | 11/2013 | Rosenberg ............ G06F 1/1632 710/303 |
| 2014/0176054 A1 | 6/2014 | Porat et al. |
| 2014/0362161 A1 | 12/2014 | Leete |
| 2015/0326052 A1* | 11/2015 | Leabman .............. H04W 12/08 320/137 |
| 2016/0094354 A1 | 3/2016 | Zhao et al. |
| 2016/0212183 A1* | 7/2016 | Dong ................. H04L 65/4038 |
| 2016/0285517 A1* | 9/2016 | Kazy ................... H04B 5/0037 |
| 2018/0241254 A1* | 8/2018 | Elliott ................... H02J 50/23 |
| 2018/0316226 A1* | 11/2018 | Jung ...................... H02J 50/12 |
| 2019/0394057 A1* | 12/2019 | Bujnowski ........... G06Q 10/109 |

FOREIGN PATENT DOCUMENTS

| | | |
|---|---|---|
| CN | 105245354 | 1/2016 |
| CN | 105262974 | 1/2016 |
| GB | 2472769 A | 2/2001 |
| WO | WO-2008/152503 A2 | 12/2008 |
| WO | WO-2011063057 | 5/2011 |
| WO | WO-2015047675 | 4/2015 |

\* cited by examiner

CONFERENCING SYSTEM

BACKGROUND

A conference system allows a plurality of users to collaborate on projects using a common computing device such as a display device from which the users may view information related to the topic they are discussing. The conference system allows for the users to be physically or virtually present in the same room, discuss openly the topic, and reflect the outcome of their discussion in, for example, a document produced via the common computing device.

Further, a conference system may communicate with a number of peripheral devices that allow a user to provide input to the common computing device. The input received from the peripheral devices may be reflected in the display device.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
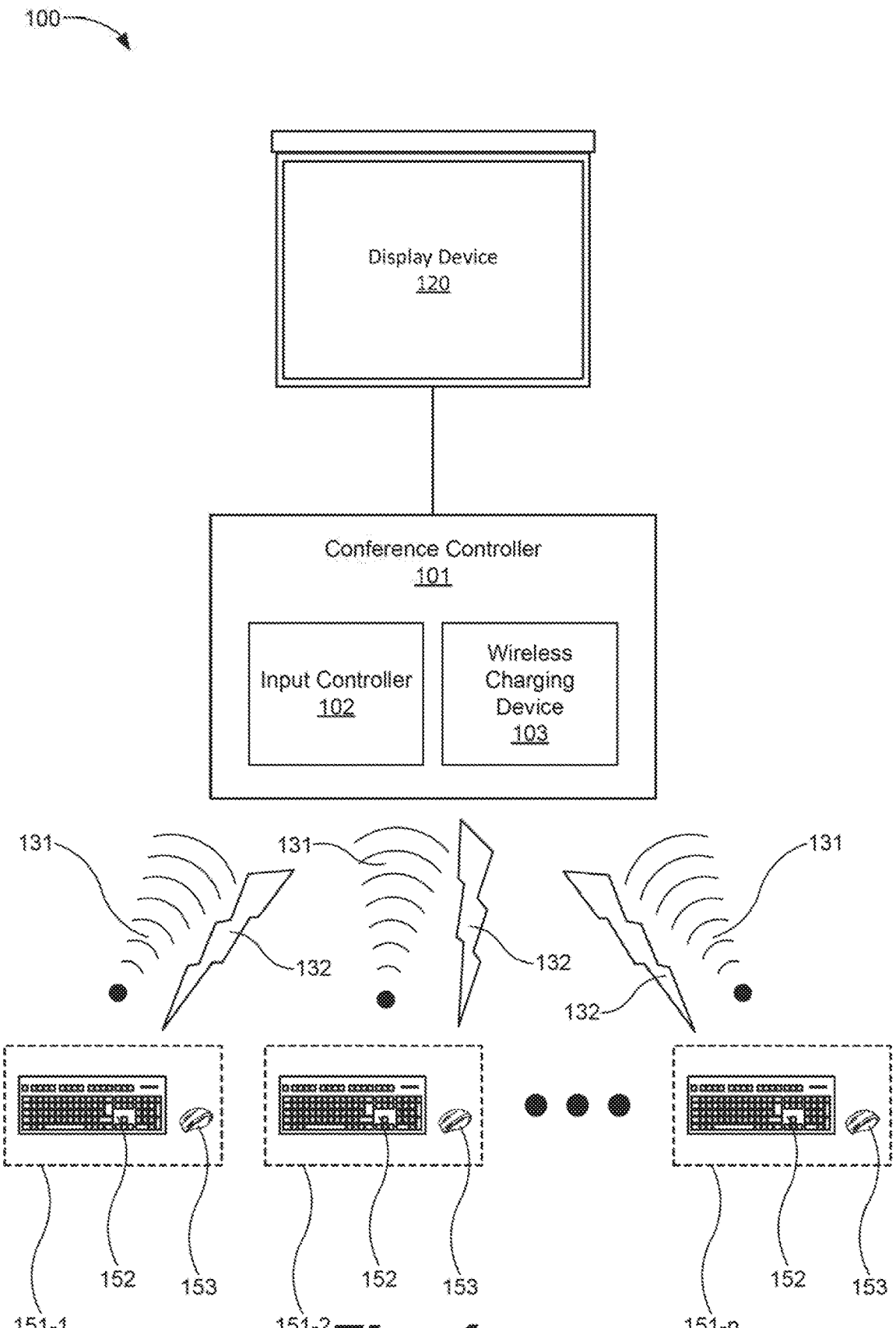
FIG. 1 is a block diagram of a conferencing system, according one example of the principles described herein.

As mentioned above a conference system allows users to interact with one another in a collaborative manner to create a document using a common computing device. The conference system may, however, not allow users to freely edit a document that is being produced by the conference attendees. For example, non-simultaneous interaction may take place where the conference system allows a single user to edit the document or otherwise interact with the common computing device. In this example, control of the computing device may be switched from one user to another. In some conference systems, physical transfer of a set of peripheral devices from one user to another may occur, resulting in a very time consuming and cumbersome switching scenario since the length of wires coupling the peripheral devices get in the, way or may be too short to extend to another user. Thus, the switching of control between users creates a situation wherein all the users may not be given an opportunity to participate in the conference or edit the document, or at least creates a very inefficient manner of collaboration by restricting the freedom of expression from those users who do not have control of the computing system.

Further, peripheral devices used to provide input to the conference system may include wires that communicatively couple the peripheral devices to the conference system. However, these wires make moving around an area such as a room in which the conference system is located difficult due to the wires. For example, when a user wishes to approach a display device, he or she may find it difficult or dangerous to navigate around the wires of the wired peripheral devices.

Further, if wireless peripheral devices are used, users or their information technology (IT) specialists are obliged to either ensure that the wireless peripheral devices are charged or make sure the wireless peripheral devices include sufficiently charged batteries. In some instances, this type of maintenance for the wireless devices is overlooked resulting in user frustration and dissatisfaction with the conference system. Further, the wireless peripheral devices may be unsecured, and may be deliberately or accidentally taken from the conference room. Removal of the wireless peripheral devices may result in the wireless peripheral devices depleting the charge of their batteries, rendering the peripheral devices useless.

Examples described herein provide a method of charging wireless peripheral devices within a conferencing system. The method includes, with a conference controller, identifying a plurality of sets of peripheral devices in communication with the conference controller, and wirelessly charging the sets of peripheral devices based on a number of policies that define prioritization of charging of the sets of peripheral devices. The policies include wirelessly charging the sets of peripheral devices based on whether the sets of peripheral devices are authorized by the conference controller. If a first set of peripheral devices is authorized by the conference controller, wirelessly charging the first set of peripheral devices previous to wirelessly charging an unauthorized set of peripheral devices. If a first set of peripheral devices is not authorized by the conference controller, limiting wireless charging of the first set of peripheral devices.

Wireless charging the sets of peripheral devices includes a form of wireless power transfer (WPT) including power over radio frequency waves (PoRFW), photovoltaic systems that absorb and convert ambient electromagnetic wave (e.g. light waves) into electricity, magnetic inductive systems coupled between coils of wire, capacitive coupling between electrodes, radiative far-field transfer of power by beams of microwaves or lasers, or combinations thereof.

The method includes identifying, with the conference controller, input from a plurality of the sets of peripheral devices, and aligning the inputs into a sequence of instructions associated with manipulation of an application executed by the conference controller. The method further includes displaying the manipulation on an output device communicatively coupled to the conference controller.

Examples described herein also provide a conferencing system. The conferencing system includes a conference controller, a display device communicatively coupled to the conference controller to display output from the conference controller, and a plurality of sets of peripheral devices in communication with the conference controller, the sets of peripheral devices being operated by a plurality of users.

The conference controller includes an input controller to receive a plurality of inputs from a plurality of the sets of peripheral devices, align the inputs into a sequence of instructions associated with manipulation of the display device, and execute the sequence of instructions synchronously such that the manipulation of the display device is observable as being simultaneous. The conference controller includes also includes a wireless charging device to charge the sets of peripheral devices.

The plurality of sets of peripheral devices are paired to the conference controller such that the sets of peripheral devices will not pair with a second conference controller. Further, a digital tether is executed between each of a number of peripheral devices of the sets of peripheral devices and the conference controller. If any of the peripheral devices are taken a predefined distance from the conference controller, the peripheral device produces a notification, the peripheral device is locked from use, the peripheral device powers down, or combinations thereof. Inputs from a first set of peripheral devices is reflected on the display device using a first graphic that is differentiable from a second graphic associated with a second set of peripheral devices. Manipulation of the display device includes manipulation of at least one application executed by the conference controller, and displaying the manipulation of the at least one application on the display device. The plurality of sets of peripheral devices are wirelessly in communication with the conference controller.

Examples described herein further provide a computer program product for receiving inputs from a number of peripheral devices. The computer program product includes a computer readable storage medium including computer usable program code embodied therewith. The computer usable program code, when executed by a processor, receives, at a conference controller, a plurality of inputs from a plurality of sets of peripheral devices, each set of peripheral devices including a number of peripheral devices. The execution of the inputs is arranged into a sequence of instructions associated with manipulation of an application executed by the conference controller, and output the manipulation to an output device communicatively coupled to the conference controller.

The computer program product further includes computer usable program code to, when executed by the processor, identify a charge level of the sets of peripheral devices, and wirelessly charge the sets of peripheral devices based on a number of policies that define prioritization of charging of the sets of peripheral devices. The policies include wirelessly charging the sets of peripheral devices in response to a determination that the sets of peripheral devices are authorized by the conference controller, and wirelessly charging the sets of peripheral devices in response to a determination that the sets of peripheral devices are not authorized by the conference controller and the authorized sets of peripheral devices are not currently charging. Wirelessly charging the sets of peripheral devices includes at least one form of wireless power transfer (WPT).

As used in the present specification and in the appended the phrase "set of peripheral devices" is meant to be understood broadly as any group of a number of peripheral devices used to communicate with a computing device. In one example, a plurality of sets of peripheral devices may be utilized. Relatedly, as used in the present specification and in the appended claims, the term 'peripheral device' is meant to be understood broadly as any data input device. Peripheral devices may include, for example, mice, keyboards, touchpads, electronic pens, tablet devices, mobile phones, smart phones, and computing devices, among other, or combinations thereof.

As used in the present specification and in the appended claims, the term "wireless power transfer (WPT)" or similar language is meant to be understood broadly as any transmission of electrical energy from a power source to an electrical load, such as, for example, an electrical power grid or a power consuming device, without the use of discrete conductors. Forms of WPT may include, for example, power over radio frequency waves (PoRFW), photovoltaic systems that absorb and convert ambient electromagnetic wave (e.g. light waves) into electricity, magnetic inductive systems coupled between coils of wire, capacitive coupling between electrodes, and radiative far-field transfer of power by beams of microwaves or lasers, among others, or combinations thereof. In WPT, a wireless transmitter connected to a power source conveys the field energy across an intervening space to at least one receiver, where it is converted back to an electrical current and utilized by at least one power consuming circuit. WPT may be useful to power electrical devices in cases where interconnecting wires are inconvenient, hazardous, or impossible within the environment.

Even still further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a conferencing system (100), according to one example of the principles described herein. The conferencing system (100) includes a central conference controller (101), a display device (120) communicatively coupled to the conference controller (101), and a number of sets of peripheral devices (151-1, 151-2, 151-*n*) electrically and communicatively coupled to the conference controller (101). The display device (120) may be any output device that displays information to a number of users as instructed by the conference controller (101). For example, the display device (120) may include a projection system including a projector and projection screen, a television device, a touchscreen device, a digital whiteboard, a computer screen, a laptop screen, a mobile device screen, a personal digital assistant (PDA) screen, a tablet screen, and all-in-one (AIO) computing device, other display devices, or combinations thereof.

The number of sets of peripheral devices (151-1, 151-2, 151-*n*) of the conferencing system (100) each include a number of peripheral devices that provide input instructions to the conference controller (101). The sets of peripheral devices (151-1, 151-2, 151-*n*) include any number of peripheral devices including, for example, keyboards (152), mice (153), touchpads, electronic pens, tablet devices, mobile phones, smart phones, and computing devices, among other, or combinations thereof. Although three sets of peripheral devices (151-1, 151-2, 151-*n*) are depicted in FIG. 1, the conferencing system (100) may include any number of sets of peripheral devices (151-1, 151-2, 151-*n*), Further, although two peripheral devices (152, 153) are depicted in FIG. 1 as being included within the sets of peripheral devices (151-1, 151-2, 151-*n*), any number of peripheral devices (152, 153) may be included such as, for example, one peripheral device to an infinite number of peripheral devices.

The sets of peripheral devices (151-1, 151-2, 151-*n*) communicate with the conference controller (101) via wireless communication methods and systems as indicated by transmissions (131) from each of the sets of peripheral devices (151-1, 151-2, 151-*n*).

In one example, a dongle may be coupled to the conference controller (101), the peripheral devices (152, 153) of the sets of peripheral devices (151-1, 151-2, 151-*n*), or both to assist in or create a wireless connection between the sets of peripheral devices (151-1, 151-2, 151-*n*) and the conferencing system (100). A dongle may be any small piece of hardware that connects to another device to provide it with additional functionality such as providing additional forms of wireless connectivity to other devices. In this example, the dongle may facilitate or assist in wireless connectivity between the sets of peripheral devices (151-1, 151-2, 151-*n*) and the elements of the conferencing system (100).

Each of the peripheral devices (152, 153) within the sets of peripheral devices (151-1, 151-2, 151-*n*) may send transmissions to the conference controller (101). The input provided by the sets of peripheral devices (151-1, 151-2, 151-*n*) effect or manipulate any action that may be executed by the conference controller (101) to manipulate what is displayed on the display device (120). For example, input from the sets of peripheral devices (151-1, 151-2, 151-*n*) may cause the conference controller (101) to execute an application, implement edits to a document, play media, and save documents, among a myriad of other computer executable actions.

The wireless communication devices and methods employed by the sets of peripheral devices (151-1, 151-2, 151-*n*) to communicate with the conference controller (101) may include any communication method or system that allows for transfer of data between two or more devices that are not connected by an electrical conductor. Examples of wireless communications that may be used in the examples described herein include BLUETOOTH wireless communication standard as defined by the Bluetooth Special Interest Group (SIG), BLUETOOTH LOW ENERGY wireless communication standard as defined by the Bluetooth SIG, Wi-Fi wireless communications as defined by the Institute of Electrical and Electronics Engineers' (IEEE) 802.11 standards for wireless communications and developed by the Wi-Fi Alliance, WIRELESS USB radio communication protocol developed by the Wireless USB Promoter Group, LONG-TERM EVOLUTION (LTE) wireless communication standards developed by the $3^{rd}$ Generation Partnership Project (3GPP), electromagnetic waves of any frequency, other wireless communications methods and systems, or combinations thereof. Wireless communications provided via the transmissions (131) eliminates the inconvenience or the hazardous environment interconnecting wires would otherwise afford. With the use of wireless communications, users may enjoy a cleaner, simpler workspace that allows the users to move about the entire space without being restricted by cords.

The sets of peripheral devices (151-1, 151-2, 151-*n*) may also receive power from the conference controller (101) using any number of wireless power transfer (WPT) systems and methods as indicated by power transmissions (132) to provide power to the peripheral devices (152, 153) of the sets of peripheral devices (151-1, 151-2, 151-*n*), recharge internal batteries of the peripheral devices (152, 153), or a combination thereof. The conference controller (101) includes a wireless charging device (103) that controls the WPT to the peripheral devices (152, 153) within the sets of peripheral devices (151-1, 151-2, 151-*n*).

Some examples of WPT include power over radio frequency wares (PoRFW), photovoltaic systems that absorb and convert ambient electromagnetic wave (e.g. light waves) into electricity, magnetic inductive systems coupled between coils of wire, capacitive coupling between electrodes, radiative far-field transfer of power by beams of microwaves or lasers, radio frequency harvesting, harnessing energy emitted by Wi-Fi signals, other WPT methods and systems, or combinations thereof. In this manner, a user of the conferencing system (100) may be ensured that the peripheral devices (152, 153) of the sets of peripheral devices (151-1, 151-2, 151-*n*) are always powered and sufficiently charged for use without continual maintenance being performed on the peripheral devices (152, 153) such as coupling the peripheral devices (152, 153) to a power source after use, or changing the batteries of the peripheral devices (152, 153).

In one example, the WPT system employed by the examples provided herein may use a directed pocket energy system such as one developed by Energous Corporation. In this example, a wireless power transmitter may create a contained three-dimensional pocket of energy using a 5.8 GHz unlicensed industrial, scientific and medical (ISM) radio bands that transmit radio frequency (RF) energy to, in this case, the peripheral devices (152, 153) of the sets of peripheral devices (151-1, 151-2, 151-*n*). In this example, this directed pocket energy system performs a number of environment scans to identify all possible and registered receivers and directs the power router's antennas to form multiple energy pockets, each of which can power a receiver device such as the peripheral devices (152, 153) anywhere within an approximately 15-foot radius. Further, the directed pocket energy system may deliver an average of 2 W to four different devices simultaneously within this 15-foot radius.

Although more detail will be provided Blow regarding the conference controller (101), the conference controller (101) includes an input controller (102) to receive, process, and effectuate input signals from the peripheral devices (152, 153) of the sets of peripheral devices (151-1, 151-2, 151-*n*). Processing of the input signals may include identifying the inputs from the sets of peripheral devices (151-1, 151-2, 151-*n*), differentiating between the sets of peripheral devices (151-1, 151-2, 151-*n*) and their respective inputs, and aligning or arranging the inputs from the sets of peripheral devices (151-1, 151-2, 151-*n*) into a sequence of instructions associated with manipulation of actions that may be executed by the conference controller (101). Thus, the input controller (102) serves to provide equal opportunity control to each of the sets of peripheral devices (151-1, 151-2, 151-*n*) such that their respective inputs are viewed by the users as being simultaneous. Further, the input controller (102) serves to provide generic control of ail aspects of the conference controller (101) as a computing device such that the users may manipulate any aspect of the conference controller (101) including functions of the conference controller (101) itself as veil as any application executed thereon.

Figure 2:
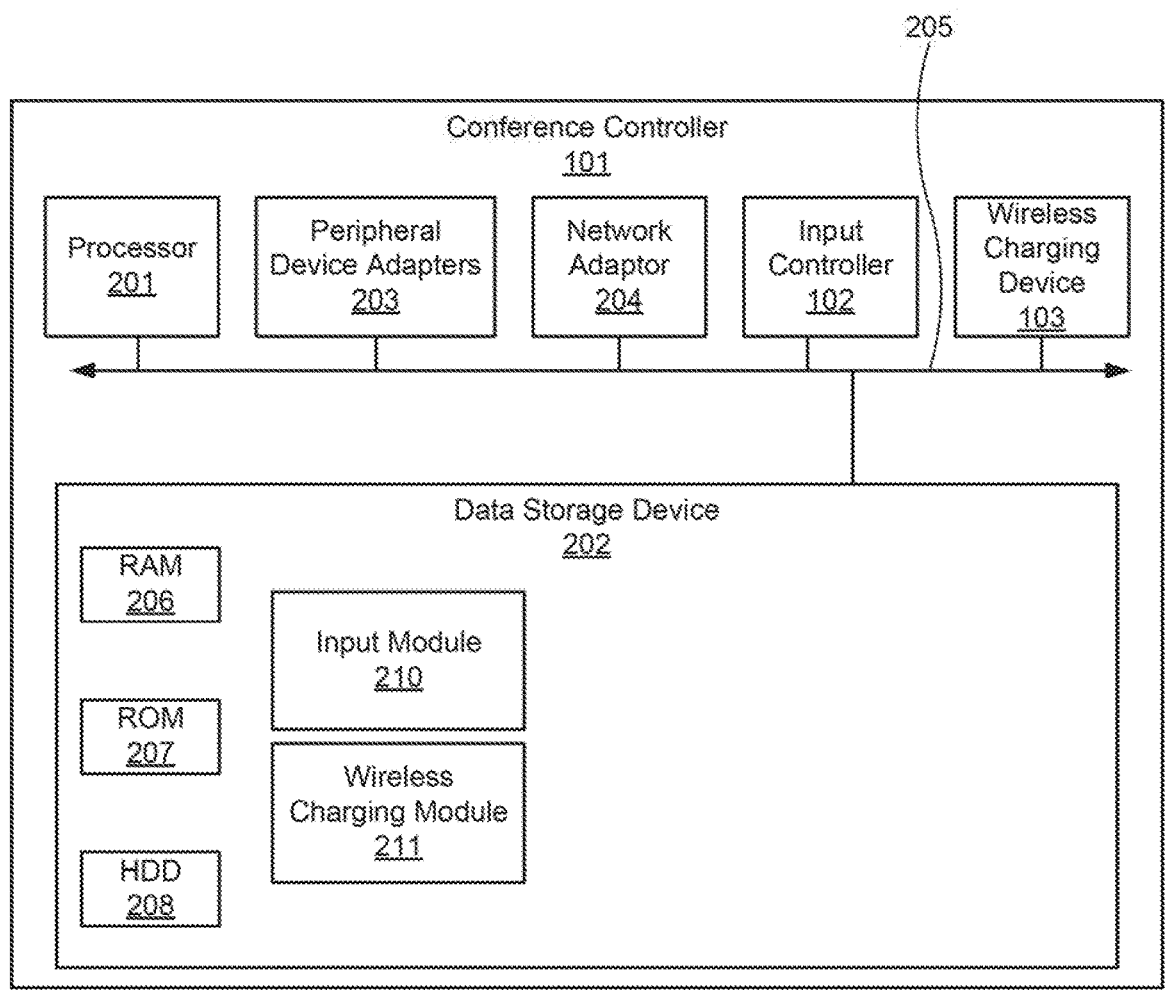
FIG. 2 is a block diagram of a central conference controller of the conferencing system of FIG. 1, according to one example of the principles described herein.
Figure 2:
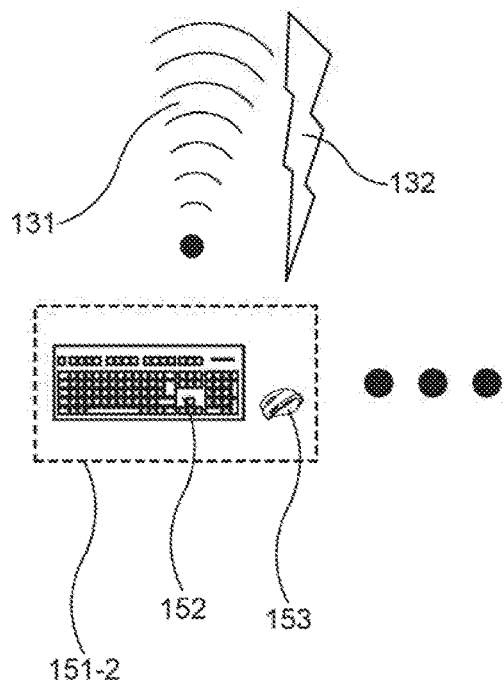

FIG. 2 is a Nock diagram of a conference controller (101) of the conferencing system (100) of FIG. 1, according to one example of the principles described herein. The conference controller (101) may be implemented as a hardware device, or a combination of hardware and software. Examples of electronic devices that make up the conference controller (101) include servers, desktop computers, laptop computers, personal digital assistants (PDAs), mobile devices, smartphones, gaming systems and tablets, among other electronic devices.

The conference controller (101) may be utilized in any data processing scenario including, stand-alone hardware, mobile applications, through a computing network, or combinations thereof. Further, the conference controller (101) may be used in a computing network, a public cloud network, a private cloud network, a hybrid cloud network, other forms of networks, or combinations thereof. In one example, the methods provided by the conference controller (101) are provided as a service over a network by, for example, a third party. In this example, the service may include, for example, the following: a Software as a Service (SaaS) hosting a number of applications, a Platform as a Service (PaaS) hosting a computing platform including, for example, operating systems, hardware, and storage, among others; an infrastructure as a Service (IaaS) hosting equipment such as, for example, servers, storage components, network, and components, among others: application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the conference controller (101) are executed by a local administrator.

To achieve its desired functionality, the conference controller (101) includes various hardware components. Among these hardware components may be a number of processors (201), a number of data storage devices (202), a number of peripheral device adapters (203), a number of network adapters (204), the input controller (102), and the wireless charging device (103). These hardware components may be interconnected through the use of a number of busses and/or network connections. In one example, the processors (201), the data storage device (202), the peripheral device adapters (203), the network adapters (204), the input controller (102), and the wireless charging device (103) may be communicatively coupled via a bus (205).

The processor (201) may include the hardware architecture to retrieve executable code from the data storage device (202) and execute the executable code. The executable code may, when executed by the processor (201), cause the processor (201) to implement at least the functionality of wirelessly charging the sets of peripheral devices (151-1, 151-2, 151-n), and align inputs from the sets of peripheral devices (151-1, 151-2, 151-n), according to the methods of the present specification described herein. In the course of executing code, the processor (201) may receive input from and provide output to a number of the remaining hardware units.

The data storage device (202) may store data such as executable program code that is executed by the processor (201) or other processing device. As will be discussed, the data storage device (202) may specifically store computer code representing a number of applications that the processor (201) executes to implement at least the functionality described herein.

The data storage device (202) may include various types of data memory modules, including volatile and nonvolatile memory. For example, the data storage device (202) of the present example includes Random Access Memory (RAM) (206), Read Only Memory (ROM) (207), and Hard Disk Drive (HDD) memory (208). Many other types of memory may also be utilized, and the present specification contemplates the use of many varying type(s) of memory in the data storage device (202) as may suit a particular application of the principles described herein. In certain examples, different types of memory in the data storage device (202) may be used for different data storage needs. For example, in certain examples the processor (201) may boot from Read Only Memory (ROM) (207), maintain nonvolatile storage in the Hard Disk Drive (HDD) memory (208) and execute program code stored in Random Access Memory (RAM) (206).

The data storage device (202) may include a computer readable medium, a computer readable storage medium, or a non-transitory computer readable medium, among others. For example, the data storage device (202) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the conference controller (101) enable the processor (201) to interface with various other hardware elements, external and internal to the conference controller (101). For example, the peripheral device adapters (103) may provide an interface to input/output devices, such as, for example, display device (109), a mouse, or a keyboard. The peripheral device adapters (103) may also provide access to other external devices such as an external storage device, a number of network devices such as, for example, servers, switches, and routers, client devices, other types of computing devices, and combinations thereof.

The peripheral device adapters (203) may also create an interface between the processor (201) and the peripheral devices (152, 153) of the sets of peripheral devices (151-1, 151-2, 151-n), a printer, or other media output devices. The network adapter (204) may provide an interface to other computing devices within, for example, a network, thereby enabling the transmission of data between the conference controller (101) and other devices located within the network.

The conference controller (101) further includes a number of modules used in the implementation of wirelessly charging the sets of peripheral devices (151-1, 151-2, 151-n), and align inputs from the sets at peripheral devices (151-1, 151-2, 151-n), according to the methods of the present specification described herein. The various modules within the conference controller (101) include executable program code that may be executed separately. In this example, the various modules may be stored as separate computer program products. In another example, the various modules within the conference controller (101) may be combined within a number of computer program products; each computer program product including a number of the modules.

The conference controller (101) may include an input module (210) to, when executed by the processor (201) and the input controller (102), receive, process, and effectuate input signals from the peripheral devices (152, 153) of the sets of peripheral devices (151-1, 151-2, 151-n) as executed by the input controller (102). Processing of the input signals may include identifying the inputs from the sets of peripheral devices (151-1, 151-2, 151-n), differentiating between the sets, of peripheral devices (151-1, 151-2, 151-n) and their respective inputs, and aligning or arranging the inputs from the sets of peripheral devices (151-1, 151-2, 151-n) into a sequence of instructions associated with manipulation of actions that may be executed by the conference controller (101). Thus, the input module (210), when executed by the input controller (102), serves to provide equal opportunity control to each of the sets of peripheral devices (151-1, 151-2, 151-n) such that their respective inputs are viewed by the users as being simultaneous.

The conference controller (101) may include a wireless charging module (211) to, when executed by the processor (201) and the wireless charging device (103), control the WPT to the peripheral devices (152, 153) within the sets of peripheral devices (151-1, 151-2, 151-n). Thus, the wireless charging module (211), when executed by the wireless charging device (103), serves to ensure that the peripheral devices (152, 153) are charged and functioning.

Figure 3:
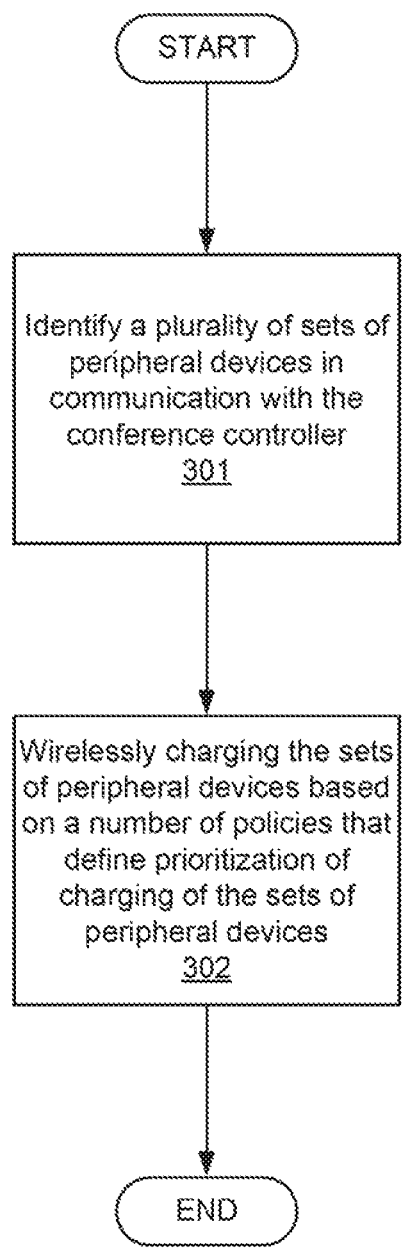
FIG. 3 is a flowchart depicting a method of charging wireless peripheral devices within a conferencing system, according to one example of the principles described herein.

Having described the conferencing system (100). FIG. 3 is a flowchart depicting a method of charging wireless peripheral devices (152, 153) within a conferencing system (100), according to one example of the principles described herein. The method of FIG. 3 may begin by identifying (block 301) a plurality of sets of peripheral devices (151-1, 151-2, 151-n) in communication with the conference controller (101). Block 301 may be performed using the processor (201), the input controller (102), the input module (210), or combinations thereof. Identification (block 301) of the sets of peripheral devices (151-1, 151-2, 151-n) may be performed using a digital handshake to negotiate and dynamically set parameters of the communications channel established between the sets of peripheral devices (151-1, 151-2, 151-n) and the conference controller (101) before active communication over the channel begins.

The method may continue by wirelessly charging (block 302) the sets of peripheral devices (151-1, 151-2, 151-n) based on a number of policies that define prioritization of charging of the sets of peripheral devices (151-1, 151-2, 151-n). The policies may be stored in the data storage device (202) and executed by the processor (201), the wireless charging device (103), the wireless charging module (211), or combinations thereof. The method may then end. More detail regarding the policies that define prioritization of charging of the sets of peripheral devices (151-1, 151-2, 151-n) will now be described in connection with FIG. 4.

Figure 4:
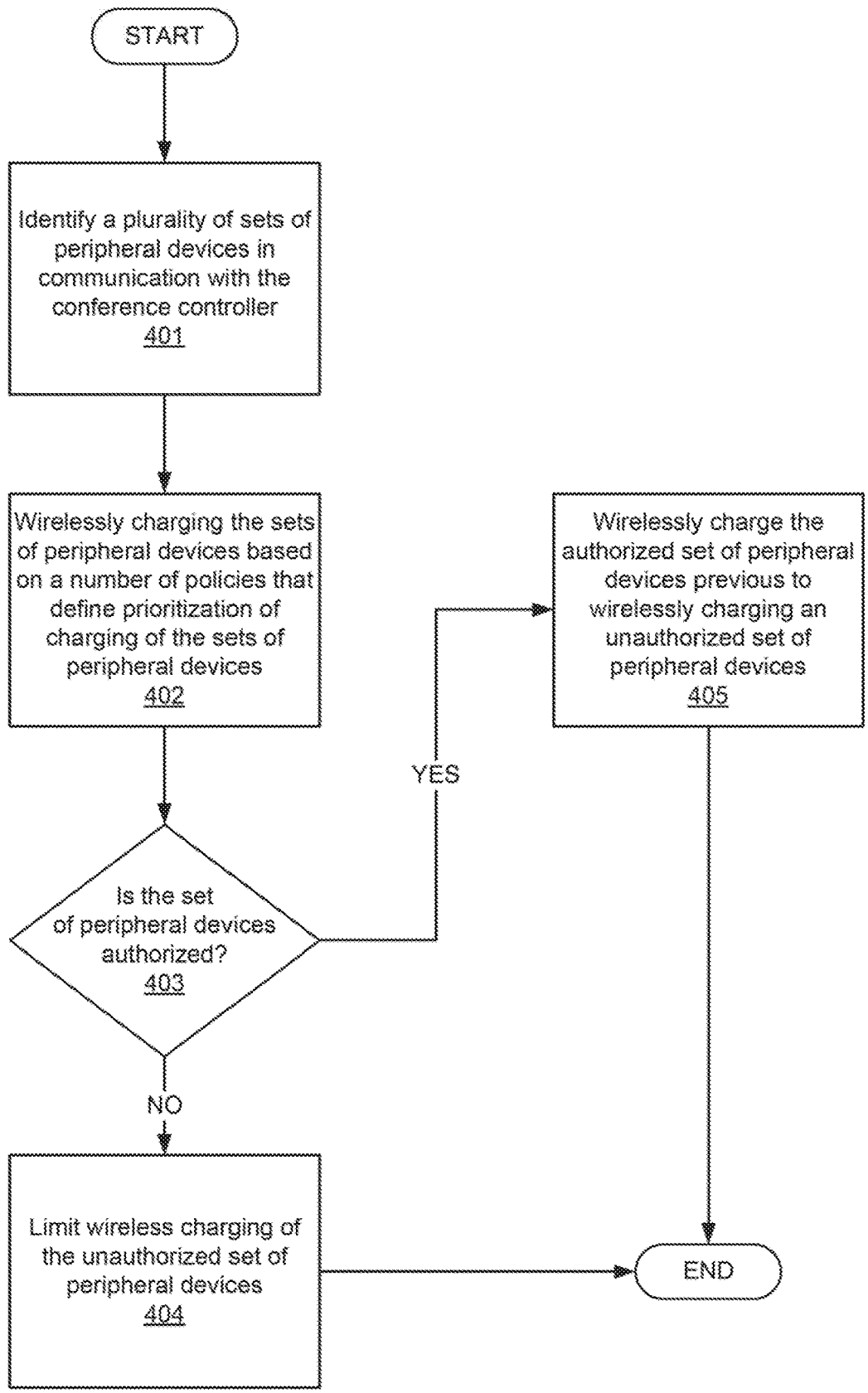
FIG. 4 is a flowchart depicting a method of charging wireless peripheral devices within a conferencing system, according to another example of the principles described herein.

FIG. 4 is a flowchart depicting a method of charging wireless peripheral devices (152, 153) within a conferencing system (100), according to another example of the principles described herein. The method of FIG. 4 may begin as described above in connection with blocks 301 and 302 of FIG. 3 with respect to blocks 401 and 402 of FIG. 4. However, in the example of FIG. 4, the method may determine if a set of peripheral devices (151-1, 151-2, 151-n) is authorized to communicate with the conferencing system (100). In one example, the policies include wirelessly charging the sets of peripheral devices (151-1, 151-2, 151-n) based on whether the sets of peripheral devices (151-1, 151-2, 151-n) are authorized by the conference controller (101). In this example, the conferencing system (100) may be located within a conferencing room, and may include a number of sets of peripheral devices (151-1, 151-2, 151-n) as a full compliment. In this example, the sets of peripheral devices (151-1, 151-2, 151-n) may be provisioned and communicatively coupled to the conferencing system (100) ahead of time, and permanently or semi-permanently assigned to that particular conferencing system (100). In this manner, sets of peripheral devices (151-1, 151-2, 151-n) from one conferencing system (100) may not be moved to and used with a second conferencing system (100). In one example, an administrator may break the pairing of a peripheral device (152, 153) in order to reallocate that peripheral device (152, 153) for another conferencing system (100) or general use. However, from a user's perspective, the peripheral device (152, 153) is permanently or semi-permanently assigned to that particular conferencing system (100). Further, because the conferencing system (100) is utilized in an environment where a group of users are interacting with the conference controller (101), a network between a number of computing devices is not required, and collaboration between users does not rely on a network connection such as one provided through the Internet.

In one example, twenty sets of peripheral devices (151-1, 151-2, 151-n) may be included in the conference room as part of the conferencing system (100). A user may bring his or her own set of peripheral devices (151-1, 151-2, 151-n) that has not yet been paired with the conference controller (101) or otherwise identified as a set of peripheral devices (151-1, 151-2, 151-n) for use with the conferencing system (100) but is not authorized by the conferencing system (100). In this situation, the user's set of peripheral de sloes (151-1, 151-2, 151-n) brought into the conference room is an unauthorized set of peripheral devices (151-1, 151-2, 151-n). It may be preferable to use the authorized sets of peripheral devices (151-1, 151-2, 151-n) already present in the conference room since these devices are already paired with the conferencing system (100).

Therefore, in this example, if a first set of peripheral devices (151-1, 151-2, 151-n) is authorized by the conference controller (101) (block 403, determination YES), the policies may direct the processor (201), the wireless charging device (103), the wireless charging module (211), or combinations thereof, to wirelessly charge (block 405) the first set of peripheral devices previous to wirelessly charging an unauthorized set of peripheral devices.

In contrast, if a first set of peripheral devices is not authorized by the conference controller (101) (block 403, determination NO), the policies may direct the processor (201), the wireless charging device (103), the wireless charging module (211), or combinations thereof, to limit (block 404) wireless charging of the first set of peripheral devices. Limiting the unauthorized set of peripheral devices may include not allowing the conferencing system (100) to wirelessly charge the unauthorized set of peripheral devices, imparting less wireless energy to the unauthorized set of peripheral devices, limiting the time the unauthorized set of peripheral devices may be charged by the conferencing system (100), devoting energy via the conference controller (101) in a prioritized manner to a number of peripherals that include a low level of stored electrical energy or whose energy capacitance is low based on the charge level of the individual peripherals, other policy-driven actions, or combinations thereof. The method of FIG. 4 ensures that only authorized peripheral devices (152, 153) are used in connection with inputting commands to the conferencing system (100). In one example, however, guest access may be provided for at least one peripheral (152, 153). In this example, if guest access is provided, the processor (201), the wireless charging device (103), the wireless charging module (211), or combinations thereof may place controls on the amount of power consumed by the guest peripheral device (152, 153), the amount of time the guest peripheral device (152, 153) draws power, or other policies associated with the guest peripheral device (152, 153). In one example, the user of the guest peripheral device (152, 153) may be charged for the consumption of power via the conferencing system (100).

In one example, a digital tether may be created between the sets of peripheral devices (151-1, 151-2, 151-n) and the conferencing system (100). This digital tether may ensure that the sets of peripheral devices (151-1, 151-2, 151-n) remain in a conference room in which the conferencing system (100) resides. The digital tether may be based on a distance from the conferencing system (100) as defined by, for example, an effectual distance of communication between the sets of peripheral devices (151-1, 151-2, 151-n) and the conferencing system (100). For example, if the BLUETOOTH wireless communication standard is used by the conferencing system (100) to communicate with the sets of peripheral devices (151-1, 151-2, 151-n), then the digital tether may be defined as the distance from the conferencing system (100) at which the BLUETOOTH wireless signal drops off. In one example, if any of the peripheral devices (152, 153) are taken a predefined distance from the conference controller (101), the peripheral device (152, 153), the conferencing system (100) or a combination thereof may produce a notification. The notification may include audible or visual notifications such as a beeping noise or a flashing light produced by the peripheral device (152, 153), the conferencing system (100), or both. In another example, when the peripheral (152, 153) is taken past the digital tether, the peripheral device (152, 153) may locked from use and rendering the peripheral device (152, 153) useless. In still another example, when the peripheral (152, 153) is taken past the digital tether, the peripheral device (152, 153) may power down. This action also renders the peripheral device (152, 153) useless. In still another example, a combination of the above actions may be taken if the peripheral (152, 153) is taken past the digital tether. In this manner, because user will know that the peripheral device (152, 153) will function in this way of it is taken away from the proximity of the conferencing system (100), the user is less likely to mistakenly or intentionally remove the peripheral device (152, 153) from the conference room in which the conferencing system (100) resides.

Figure 5:
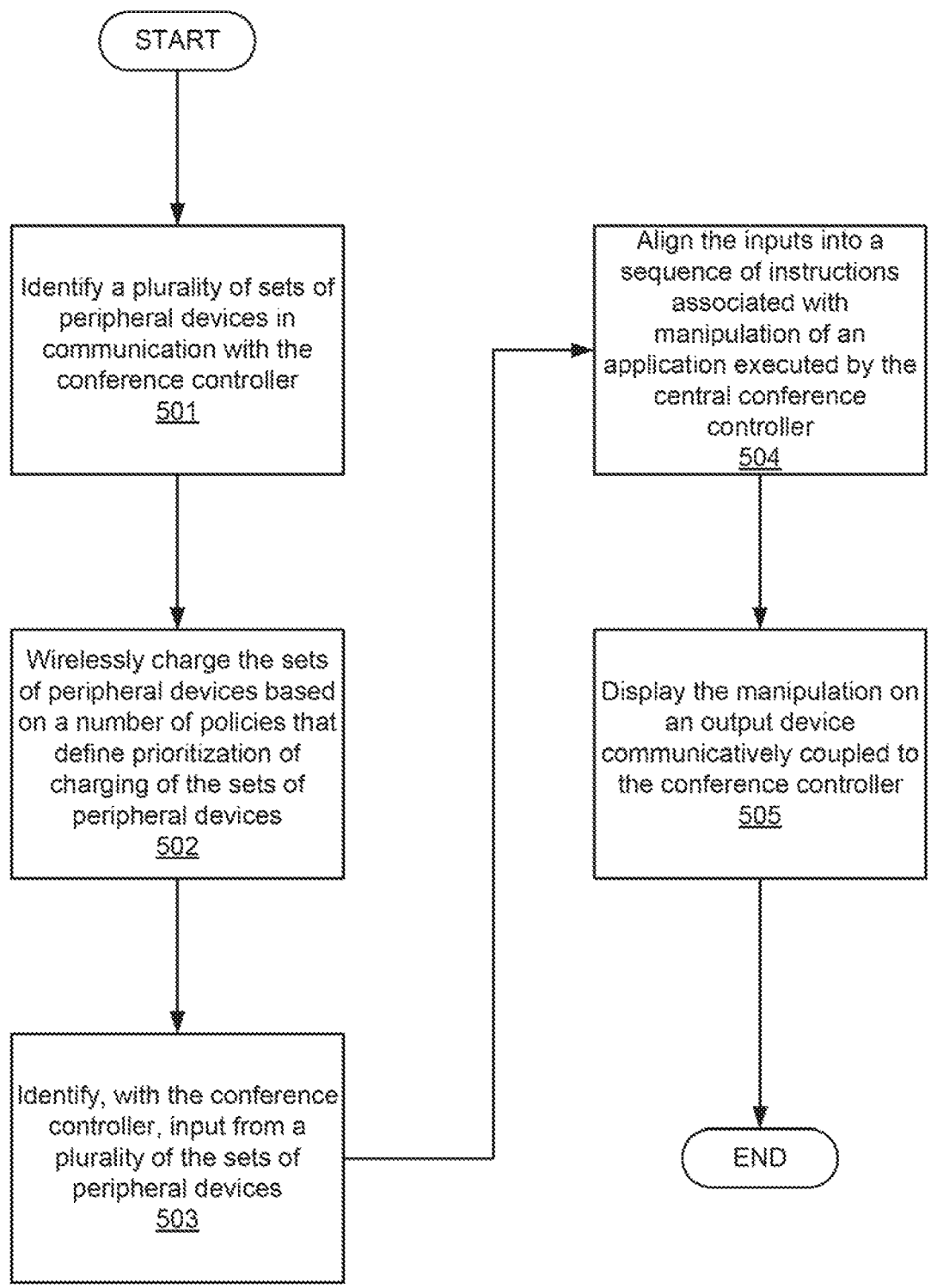
FIG. 5 is a flowchart depicting a method of charging wireless peripheral devices and input alignment within a conferencing system, according to an example of the principles described herein.

FIG. 5 is a flowchart depicting a method of charging wireless peripheral devices and input alignment within a conferencing system, according to an example of the principles described herein. The method of FIG. 5 may begin as described above in connection with blocks 301 and 302 of FIG. 3 with respect to blocks 501 and 502 of FIG. 5. As to block 502, wirelessly charging the sets of peripheral devices (151-1, 151-2, 151-n) may include identifying a charge level of the sets of peripheral devices (151-1, 151-2, 151-n). In this example, the wireless charging device (103) and the wireless charging module (211) may send a message to a peripheral device (152, 153) requesting information regarding that peripheral device's (152, 153) remaining power capacity. In this example, the policies described above may further include a policy that causes the wireless charging device (103) and the wireless charging module (211) to wirelessly charge that peripheral device (152, 153) or that set of peripheral devices (151-1, 151-2, 151-n) if it is the peripheral device (152, 153) with the lowest remaining capacity.

The method of FIG. 5 further in des identifying (block 503), with the conference controller (101), input from a plurality of the sets of peripheral devices (151-1, 151-2, 151-n). The inputs from the plurality of the sets of peripheral devices (151-1, 151-2, 151-n) may be identified by the processor (201), the input controller (102), the input module (210), or combinations thereof.

These elements of the conference controller (101) may align (block 504) the inputs into a sequence of instructions associated with manipulation of an application executed by the conference controller (101). Because, for example, a plurality of mice (153) may be providing input to the conference system (100), the conference controller (101) may track a corresponding number of inputs and provide feedback for the plurality of inputs in the form of, for example, displaying and tracking on the display device (120) a corresponding number of separate identifiers; one identifier for each mouse (153) that provides input. In this example, the identifier may include a cursor or pointer displayed on the display device (120). In one example, the inputs from a first set of peripheral devices (151-1, 151-2, 151-n) may be reflected on the display device (120) using a first graphic that is differentiable from a second graphic associated with a second set of peripheral devices (151-1, 151-2, 151-n). The graphic may be the above-mentioned cursor of pointer that includes a different shape, size, shade, fill, color, or other form factor that differentiates that set of peripheral devices' (151-1, 151-2, 151-n) tracked input. In this manner, the conference controller (101) is able to accept a plurality of inputs from a corresponding number of sets of peripheral devices (151-1, 151-2, 151-n), and visually differentiate the separate inputs from one another on the display device. This allows the users of the conferencing system (100) to receive visual feedback related to their respective input from their respective set of peripheral devices (151-1, 151-2, 151-n). Similar input feedback is provided in connection with other types of peripheral devices (152, 153) such that each user may visually perceive how their input from a keyboard, for example, is being accepted by the conference controller (101) and reflected visually on the display device (120). In one example, in order to cut down on clutter of the display device (120), the visual feedback of currently inactive peripheral devices (152, 153) may be suppressed, so that the cursor or pointer of an unused peripheral device (152, 153) is not blocking the images presented on the display device (120). In this example, activation or waking of a peripheral device (152, 153) may visually bring back the cursor, pointer, or other visual representation.

Aligning (block 504) the inputs into a sequence of instructions associated with manipulation of an application executed by the conference controller (101) also includes receiving the inputs from the plurality of sets of peripheral devices (151-1, 151-2, 151-n), and sequentially receiving the inputs from the plurality of sets of peripheral devices (151-1, 151-2, 151-n) and executing those inputs in the order received. The speed of modern computing devices allows for fast enough processing to handle multiple inputs such as these sequential inputs from the plurality of sets of peripheral devices (151-1, 151-2, 151-n) in a manner that is visually perceived by the users as being simultaneous.

The method of FIG. 5 may also include displaying (block 505) the manipulation on an output device communicatively coupled to the conference controller (101) such as the display device (120). The users are then able to receive visual feedback regarding their intended inputs via the display device (120) of the conferencing system (100).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the conference controller (101) of the conferencing system (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a conferencing system. The conferencing system includes a conference controller, a display device communicatively coupled to the conference controller to display output from the conference controller, and a plurality of sets of peripheral devices in communication with the conference controller, the sets of peripheral devices being operated by a plurality of users. The conference controller includes an input controller to receive a plurality of inputs from a plurality of the sets of peripheral devices, align the inputs into a sequence of instructions associated with manipulation of the display device, and execute the sequence of instructions synchronously such that the manipulation of the display device is observable as being simultaneous. The conference controller also includes a wireless charging device to charge the sets of peripheral devices. This conferencing system may (1) provide equal access and control of the conference controller (101) and its various functions; (2) provide equal opportunity for control allows for seamless interaction from multiple users in multiple locations within a conference room; (3) provides constant charging of peripheral devices to allow for immediate use once users enter the conference room; (4) reduces or eliminates maintenance associated with the peripheral devices; (5) reduces or eliminates the possibility of peripheral devices being intentionally or mistakenly taken out of the conference room; and (6) allows of utilization of existing conferencing devices with the conference controller and while using plug-and-play peripheral device drivers by using a number of peripheral device adaptors (203) such as USB ports of the conference controller (101).

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of charging wireless peripheral devices within a conferencing system comprising:
    identifying, by a conference controller, a plurality of sets of peripheral devices in communication with the conference controller;
    prioritizing the sets of peripheral devices for charging based on a number of policies that define charging priority of the sets of peripheral devices; and
    wirelessly charging, by the conference controller, the sets of peripheral devices according to the charging priority of the sets of peripheral devices.

2. The method of claim 1, wherein the policies comprise prioritizing wirelessly charging of the sets of peripheral devices based on whether the sets of peripheral devices are authorized by the conference controller.

3. The method of claim 2, wherein when a first set of peripheral devices is authorized by the conference controller,
    the first set of peripheral devices are wirelessly charged previous to wirelessly charging an unauthorized set of peripheral devices.

4. The method of claim 2, wherein when a first set of peripheral devices is not authorized by the conference controller
    time of wireless charging of the first set of peripheral devices is limited by the conference controller.

5. The method of claim 1, wherein wirelessly charging the sets of peripheral devices is performed using a form of wireless power transfer (WPT), the form of the WPT comprising power over radio frequency waves (PoRFW), photovoltaic systems that absorb and convert ambient electromagnetic wave (e.g. light waves) into electricity, magnetic inductive systems coupled between coils of wire, capacitive coupling between electrodes, radiative far-field transfer of power by beams of microwaves or lasers, or combinations thereof.

6. The method of claim 1, comprising:
    identifying, by the conference controller, input from a plurality of the sets of peripheral devices;
    aligning, by the conference controller, the inputs into a sequence of instructions associated with manipulation of an application executed by the conference controller; and
    displaying, by the conference controller, the manipulation on an output device communicatively coupled to the conference controller.

7. A conferencing system comprising:
    a conference controller;
    a display device communicatively coupled to the conference controller to display output from the conference controller; and
    a plurality of sets of peripheral devices in communication with the conference controller, the sets of peripheral devices being operated by a plurality of users;
    wherein the conference controller is to:
        receive, by an input controller, a plurality of inputs from a plurality of the sets of peripheral devices;
        align, by the input controller, the inputs into a sequence of instructions associated with manipulation of the display device; and
        execute, by the input controller, the sequence of instructions synchronously such that the manipulation of the display device is observable as being simultaneous; and
    a wireless charging device to charge the sets of peripheral devices.

8. The conferencing system of claim 7, wherein the plurality of sets of peripheral devices are paired to the conference controller such that the sets of peripheral devices will not pair with a second conference controller.

9. The conferencing system of claim 7, wherein a digital tether is executed between each of a number of peripheral devices of the sets of peripheral devices and the conference controller, and wherein, when any of the peripheral devices are taken a predefined distance from the conference controller, the peripheral device produces a notification, the peripheral device is locked from use, the peripheral device powers down, or combinations thereof.

10. The conferencing system of claim 7, wherein inputs from a first set of peripheral devices is reflected on the display device using a first indicator that is differentiable from a second indicator associated with a second set of peripheral devices.

11. The conferencing system of claim 7, wherein manipulation of the display device comprises:
   manipulation of at least one application executed by the conference controller; and
   displaying the manipulation of the at least one application on the display device.

12. The conferencing system of claim 7, wherein the plurality of sets of peripheral devices are wirelessly in communication with the conference controller.

13. A computer readable storage medium for receiving inputs from a number of peripheral devices comprising computer usable program code embodied therewith, the computer usable program code to, when executed by a processor:
   receive, at a conference controller, a plurality of inputs from a plurality of sets of peripheral devices, each set of peripheral devices comprising a number of peripheral devices;
   arrange execution of the inputs into a sequence of instructions associated with manipulation of an application executed by the conference controller; and
   output the manipulation to an output device communicatively coupled to the conference controller.

14. The computer program product of claim 13, comprising computer usable program code to, when executed by the processor:
   identify a charge level of the sets of peripheral devices; and
   wirelessly charge the sets of peripheral devices based on a number of policies that define charging priority of the sets of peripheral devices,
   wherein the policies comprise:
      determining whether each set of peripheral devices is authorized by the conference controller or unauthorized by the conference controller;
      where a set of peripheral devices is authorized by the conference controller, wirelessly charging the set of peripheral devices in response to a determination that the set of peripheral devices is authorized by the conference controller; and
      where a set of peripheral devices is unauthorized by the conference controller, wirelessly charging the sets of peripheral devices in response to a determination that authorized sets of peripheral devices are not currently charging.

15. The computer program product of claim 13, comprising computer usable program code to, when executed by the processor:
   identify a charge level of the peripheral devices of each set of peripheral devices; and
   wirelessly charge a first peripheral device when it is a peripheral device with the lowest remaining capacity.

16. The method of claim 1, further comprising:
   determining whether a first set of peripheral devices of the plurality of sets of peripheral devices is authorized for wireless charging; and
   limiting the amount of power deliverable to the first set of peripheral devices when the first set of peripheral devices is determined to be unauthorized.

17. The method of claim 2, wherein:
   the policies that define charging priority of the sets of peripheral devices cause a wireless charging device to limit the amount of power to be consumed or limit the amount of time to consume power by a first set of peripheral devices when the first set of peripheral devices of the plurality of sets of peripheral devices is determined to have guest access.

* * * * *